United States Patent
Lee et al.

(10) Patent No.: US 11,002,326 B2
(45) Date of Patent: May 11, 2021

(54) ELECTRONIC PARKING BRAKE

(71) Applicant: MANDO CORPORATION, Pyeongtaek-si (KR)

(72) Inventors: Hyon-Jang Lee, Seongnam-si (KR); Yoo-Don Jung, Seongnam-si (KR); Moo-Kang Son, Suwon-si (KR)

(73) Assignee: MANDO CORPORATION, Pyeongtaek-si (KR)

( * ) Notice: Subject to any disclaimer, the term of this patent is extended or adjusted under 35 U.S.C. 154(b) by 197 days.

(21) Appl. No.: 15/686,697

(22) Filed: Aug. 25, 2017

(65) Prior Publication Data
US 2018/0058526 A1    Mar. 1, 2018

(30) Foreign Application Priority Data

Aug. 31, 2016  (KR) .................. 10-2016-0111985
Dec. 8, 2016   (KR) .................. 10-2016-0166549

(51) Int. Cl.
*F16D 65/28*  (2006.01)
*F16D 51/28*  (2006.01)
(Continued)

(52) U.S. Cl.
CPC .............. *F16D 65/28* (2013.01); *B60T 7/107* (2013.01); *B60T 13/746* (2013.01); *F16D 51/22* (2013.01);
(Continued)

(58) Field of Classification Search
CPC ............ F16D 2131/00; F16D 2121/24; F16D 2125/40; F16D 2125/60; F16D 65/24; F16D 65/28; B60T 7/107; B60T 13/746
(Continued)

(56) References Cited

U.S. PATENT DOCUMENTS 2,136,835 A *  11/1938  Begg ................... B60T 11/22
                                               137/159
4,442,923 A *   4/1984  Wakatsuki ............. F16D 65/56
                                               188/196 BA
(Continued)

FOREIGN PATENT DOCUMENTS

CN    105083245 A    11/2015
CN    105299107 A     2/2016
(Continued)

OTHER PUBLICATIONS

Chinese Office Action dated Feb. 2, 2019 issued in Chinese Patent Application No. 2017107561405.
(Continued)

*Primary Examiner* — Bradley T King
*Assistant Examiner* — James K Hsiao
(74) *Attorney, Agent, or Firm* — Morgan, Lewis & Bockius LLP

(57) ABSTRACT

Disclosed is an electronic parking brake. The electronic parking brake is provided with an operating lever, which is configured to support first and second brake shoes, which are installed at both sides inside a drum, and push the first and second brake shoes toward an inner surface of the drum when a pivot lever is pulled, and is electronically activated to operate the pivot lever to brake the drum, and the electronic parking brake includes a housing mounted on a vehicle body; an actuator installed at the housing and configured to generate a driving force for braking; a power conversion unit having a nut member configured to be rotated by receiving the driving force from the actuator, and a spindle member screw-coupled to the nut member to allow a rectilinear movement; and a parking cable configured to move according to a reciprocal linear movement of the spindle member, operate the parking brake, release an operation of the parking brake, and be connected to an end of one
(Continued)

side of the spindle member, wherein the parking cable has a predetermined length and is formed with a single integrated type steel bar body to prevent occurrence of a bending deformation.

12 Claims, 12 Drawing Sheets

(51) Int. Cl.
*B60T 7/10* (2006.01)
*B60T 13/74* (2006.01)
*F16D 51/22* (2006.01)
*F16D 125/60* (2012.01)
*F16D 51/00* (2006.01)
*F16D 121/24* (2012.01)
*F16D 125/40* (2012.01)
*F16D 125/62* (2012.01)
*F16D 125/64* (2012.01)

(52) U.S. Cl.
CPC .............. *F16D 51/28* (2013.01); *F16D 51/00* (2013.01); *F16D 2121/24* (2013.01); *F16D 2125/40* (2013.01); *F16D 2125/60* (2013.01); *F16D 2125/62* (2013.01); *F16D 2125/64* (2013.01)

(58) Field of Classification Search
USPC ............................................ 188/2 D, 24.21
See application file for complete search history.

(56) References Cited

U.S. PATENT DOCUMENTS

| | | | | |
|---|---|---|---|---|
| 4,456,101 A * | 6/1984 | Yamamoto | ................ | B62L 3/00 188/196 BA |
| 4,570,506 A * | 2/1986 | Yamamoto | .............. | F16D 65/56 188/196 BA |
| 4,865,165 A * | 9/1989 | Taig | ...................... | B60T 11/046 188/156 |
| 4,940,911 A * | 7/1990 | Wilson | ................... | H02K 5/132 310/87 |
| 5,009,122 A * | 4/1991 | Chaczyk | ................... | F16C 1/10 74/18 |
| 5,131,288 A * | 7/1992 | Barlas | ..................... | B60T 7/045 188/2 D |
| 5,180,038 A * | 1/1993 | Arnold | ................. | B60T 13/743 188/171 |
| 5,631,443 A * | 5/1997 | Scrimpshire | .......... | G02B 6/3887 174/359 |
| 5,758,731 A * | 6/1998 | Zollinger | .................. | E21B 4/18 175/51 |
| 5,886,294 A * | 3/1999 | Scrimpshire | ......... | G02B 6/3887 174/359 |
| 6,273,733 B1 * | 8/2001 | Uchiyama | ............... | H01T 13/04 439/125 |
| 6,378,668 B1 * | 4/2002 | Zemyan | .................... | B60T 7/08 188/153 R |
| 6,389,928 B1 * | 5/2002 | Kobayashi | .............. | B60T 7/104 188/24.22 |
| 6,446,768 B2 * | 9/2002 | Kikuta | .................. | B60T 13/746 188/156 |
| 6,513,632 B2 * | 2/2003 | Peter | ...................... | B60T 7/107 188/156 |
| 6,581,729 B1 * | 6/2003 | Moriwaki | ................ | F16C 1/12 188/106 A |
| 6,666,302 B2 * | 12/2003 | Mizuno | ................... | F16D 51/20 188/106 P |
| 6,968,919 B2 * | 11/2005 | Shimizu | ................. | B62D 1/163 180/444 |
| 7,407,412 B2 * | 8/2008 | Khemakhem | ............ | H01R 4/70 439/282 |
| 7,767,908 B2 * | 8/2010 | Sylvan | ....................... | F16L 5/10 174/72 A |
| 8,011,482 B2 * | 9/2011 | Boyle | ................... | B60T 13/746 188/156 |
| 8,197,155 B2 * | 6/2012 | Noh | ....................... | B60T 11/046 188/2 D |
| 8,235,181 B2 * | 8/2012 | Sano | ..................... | B60T 13/746 188/156 |
| 8,365,874 B2 * | 2/2013 | Huang | .................... | B60T 7/107 188/156 |
| 8,490,513 B2 * | 7/2013 | Chiou | ..................... | F16C 1/102 74/502.4 |
| 8,607,938 B2 * | 12/2013 | Lee | ........................ | B60T 13/746 188/162 |
| 9,608,361 B2 * | 3/2017 | Vaccaro | .............. | H01R 13/5205 |
| 2001/0004035 A1 * | 6/2001 | Asai | ......................... | F16D 51/50 188/79.51 |
| 2001/0037918 A1 * | 11/2001 | Kurihara | .................. | F16D 51/50 188/72.9 |
| 2002/0084154 A1 | 7/2002 | Peter | | |
| 2004/0055833 A1 * | 3/2004 | Tatsumi | ................. | B60T 11/046 188/2 D |
| 2004/0112692 A1 * | 6/2004 | Plantan | .................... | B60T 13/22 188/170 |
| 2004/0245730 A1 * | 12/2004 | Holland | ................. | F16L 37/138 277/602 |
| 2006/0151257 A1 * | 7/2006 | Peasley | ................... | F16D 65/14 188/2 D |
| 2010/0133051 A1 * | 6/2010 | Trimpe | .................... | B60T 8/267 188/156 |
| 2010/0248533 A1 * | 9/2010 | Montena | ............ | H01R 13/5213 439/521 |
| 2014/0027221 A1 * | 1/2014 | Akada | ...................... | F16D 51/50 188/325 |
| 2015/0159711 A1 * | 6/2015 | Choi | ....................... | F16D 65/14 188/162 |
| 2015/0330465 A1 * | 11/2015 | Shin | ....................... | B60T 11/046 188/162 |
| 2015/0345581 A1 * | 12/2015 | Shin | ......................... | F16D 65/16 188/106 F |
| 2015/0362030 A1 * | 12/2015 | Choi | ...................... | F16D 65/14 188/2 D |
| 2016/0152214 A1 * | 6/2016 | Koga | ....................... | F16D 65/09 188/325 |
| 2018/0345937 A1 * | 12/2018 | Winkler | .................... | F16H 25/20 |
| 2020/0189549 A1 * | 6/2020 | Mazzarini | ............... | F16D 51/22 |

FOREIGN PATENT DOCUMENTS

| | | |
|---|---|---|
| DE | 1037284 B | 8/1958 |
| DE | 60015633 T2 | 12/2005 |
| EP | 1041301 A2 | 11/2004 |
| EP | 1767419 B1 | 10/2012 |
| GB | 2078881 A | 1/1982 |
| JP | 2003-028215 A | 1/2003 |
| KR | 10-1274150 B1 | 6/2013 |
| KR | 10-2015-0132808 A | 11/2015 |
| KR | 10-2015-0138013 A | 12/2015 |
| WO | 2016/064980 A1 | 4/2016 |

OTHER PUBLICATIONS

Chinese Office Action dated Aug. 20, 2019 issued in Chinese Patent Application No. 20170756140.5.
German Office Action dated Aug. 29, 2019 issued in German Patent Application No. 102017214938.8.

* cited by examiner

ELECTRONIC PARKING BRAKE

This application claims the benefit of Korean Patent Application Nos. 2016-0166549 and 2016-0111985, filed on August 31, and Dec. 8, 2016, respectively in the Korean Intellectual Property Office, the disclosure of which is incorporated herein by reference.

BACKGROUND

1. Field

Embodiments of the present disclosure relate to a parking brake mounted on a vehicle, and more particularly, to an electronic parking brake which is operated by a motor.

2. Description of the Related Art

Generally, a parking brake is a device for stopping a vehicle to prevent movement of the vehicle when the vehicle is parked, and serves to hold a wheel of the vehicle to prevent rotation of the wheel. For example, a parking brake is used as a drum in hat (DIH) type brake device, and conventionally, the parking brake pulls a parking cable according to a manipulation of a hand brake or a foot brake to generate a braking force. At this point, when a drum brake is used as the parking brake, the DIH type brake is a brake that is coupled to a disc brake and used for braking a rear wheel by a hydraulic pressure.

Recently, an electronic parking brake device of a motor on a DIH (MOD) type brake device, which is configured to pull a parking cable using a driving force of a motor, is used instead of a type of a brake device in which the parking cable is manually pulled. An electronic parking brake device is disclosed in Korean Registered Patent No. 10-1274150. According to the above-described Korean Registered Patent, the electronic parking brake device is provided with a motor, a rotating member for converting a rotational movement into a rectilinear movement through a decelerator, and a nut member, and is configured to operate a parking cable during the rectilinear movement to obtain a braking force. That is, the parking cable pulls a pivot lever through a driving force of the motor to push two brake shoes toward an inner surface of a drum such that the braking force is generated.

Also, the electronic parking brake device is configured such that the motor, the decelerator, the rotating member, and the like are accommodated in a housing, and a dust cover (a so called "boot") is installed at one open side of the housing, which is connected to the parking cable, to prevent a flow of foreign materials or moisture into the housing.

However, since the pivot lever and an end portion of the parking cable, which is connected to the pivot lever, are provided to be in one-side contact with each other, an operating load is concentrated on a portion that is in one-side contact such that a problem of damage to the pivot lever or the parking cable occurs. This is because components are each manufactured and assembled by specialized companies.

Also, when a parking braking force is generated for a long time, a bending phenomenon occurs on a parking cable configured with a twisted wire such as a wire and the like, and thus there are problems in that a one-side contact occurs and a stroke section (a section from a braking generation time to a braking completion time) is increased such that an operation response speed is reduced.

In addition, since a known electronic parking brake is provided with a sealing structure employing a single dust cover, when a parking braking force is repetitively generated, a contact portion between the dust cover and the parking cable is worn by operational friction between the dust cover and the parking cable such that a problem in that moisture and foreign materials flow inside the housing occurs. Consequently, due to the inflow of the foreign materials and the moisture, an abnormal load occurs at an electronic component and a mechanical component such that a failure occurs, and thus a problem of shortening the lifetime of a product occurs.

PRIOR ART DOCUMENT

Patent Document (Patent Document 1) Korean Registered Patent No. 10-1274150 (Kabushikikaisha HI-LEX CORPORATION) Jun. 5, 2013 (registered date), FIG. 18

SUMMARY

Therefore, it is an aspect of the present disclosure to provide an electronic parking brake capable of preventing an increase of a stroke when a braking operation is performed and improving power transmission performance by providing a parking cable with a single integrated type steel bar body to prevent occurrence of a bending deformation.

Also, in accordance with the electronic parking brake according to the embodiment of the present disclosure, a parking cable and a pivot lever are provided to be in surface contact with each other, and thus the parking cable is prevented from escaping and stress concentration due to a one-side contact is eliminated when the braking operation is performed such that durability can be improved.

Further, in accordance with the electronic parking brake according to the embodiment of the present disclosure, a dual sealing structure is provided at a connection portion between a housing and the parking cable such that a flow of foreign materials and moisture into the housing may be prevented.

Additional aspects of the disclosure will be set forth in part in the description which follows and, in part, will be obvious from the description, or may be learned by practice of the disclosure.

In accordance with one aspect of the present invention, there is provided an electronic parking brake provided with an operating lever, which is configured to support first and second brake shoes, which are installed at both sides inside a drum, and push the first and second brake shoes toward an inner surface of the drum when a pivot lever is pulled, and electronically activated to operate the pivot lever to brake the drum, and the electronic parking brake includes a housing mounted on a vehicle body; an actuator installed at the housing and configured to generate a driving force for braking; a power conversion unit having a nut member configured to be rotated by receiving the driving force from the actuator, and a spindle member screw-coupled to the nut member to allow a rectilinear movement; and a parking cable configured to move according to a reciprocal linear movement of the spindle member, operate the parking brake, release an operation of the parking brake, and be connected to an end of one side of the spindle member, wherein the parking cable has a predetermined length and is formed with a single integrated type steel bar body to prevent occurrence of a bending deformation.

Also, the parking cable may be provided with a first coupler coupled to the spindle member, a second coupler coupled to the pivot lever, and a connector configured to connect the first coupler to the second coupler.

Also, the connector may be formed to have a relatively greater thickness than the second coupler.

Also, the pivot lever may be provided with a pair of supporters which are formed such that one end of the pivot lever branches to be positioned at both sides of the second coupler, and a latching part may be formed to protrude from the second coupler to be in surface contact with an upper side of each of the pair of supporters.

Also, an outer surface of the latching part may have a rounded shape, and a rounded latching groove may be formed at each of the pair of supporters to correspond to and be in contact with the outer surface of the latching part.

Also, the electronic parking brake may further include a dust cover configured to prevent a flow of foreign materials between the parking cable and the power conversion unit.

Also, a coupling depression may be formed at an outer side of the parking cable to be coupled to the dust cover.

Also, the dust cover may include a first dust cover installed at an inlet side of a through-hole of the housing such that a flow of foreign materials into the housing is prevented, and provided to surround an outer circumferential surface of a portion of the parking cable, wherein the through-hole is formed in a movement direction of the spindle member; and a second dust cover installed to surround the first dust cover.

Also, the first dust cover may include a first body having an inner space through which the parking cable passes, and an outside surface on which a plurality of wrinkles are formed; a first mounting part provided at one end of the first body and installed at the housing; and a first inflow prevention part provided at the other end of the first body and provided to surround the outer circumferential surface of the parking cable.

Also, the first mounting part may be formed to extend from the first body in a radial direction, and a seating recess corresponding to the first mounting part may be formed at the housing to enable the first mounting part to be inserted into the inlet side of the through-hole.

Also, the second dust cover may include a second body having an inner space configured to accommodate the first dust cover, and an outside surface on which a plurality of wrinkles are formed; a second mounting part provided at one end of the second body and coupled to the first dust cover; and a second inflow prevention part provided at the other end of the second body and provided to surround an outer circumferential surface of a portion of the parking cable.

Also, the second inflow prevention part may be positioned to be farther away from the housing than the first inflow prevention part, and may be provided to surround the outer circumferential surface of the parking cable.

Also, the second mounting part may be formed to be bent and may be in close contact with and coupled between the plurality of wrinkles.

Also, the first and second dust covers may be configured with an elastically deformable rubber material.

BRIEF DESCRIPTION OF THE DRAWINGS

While the present disclosure will be described in detail with reference to the following drawings, since these drawings show preferred embodiments of the present disclosure, the technical spirit of the present disclosure is not to be construed as being limited to these drawings.

DETAILED DESCRIPTION

Figure 1:
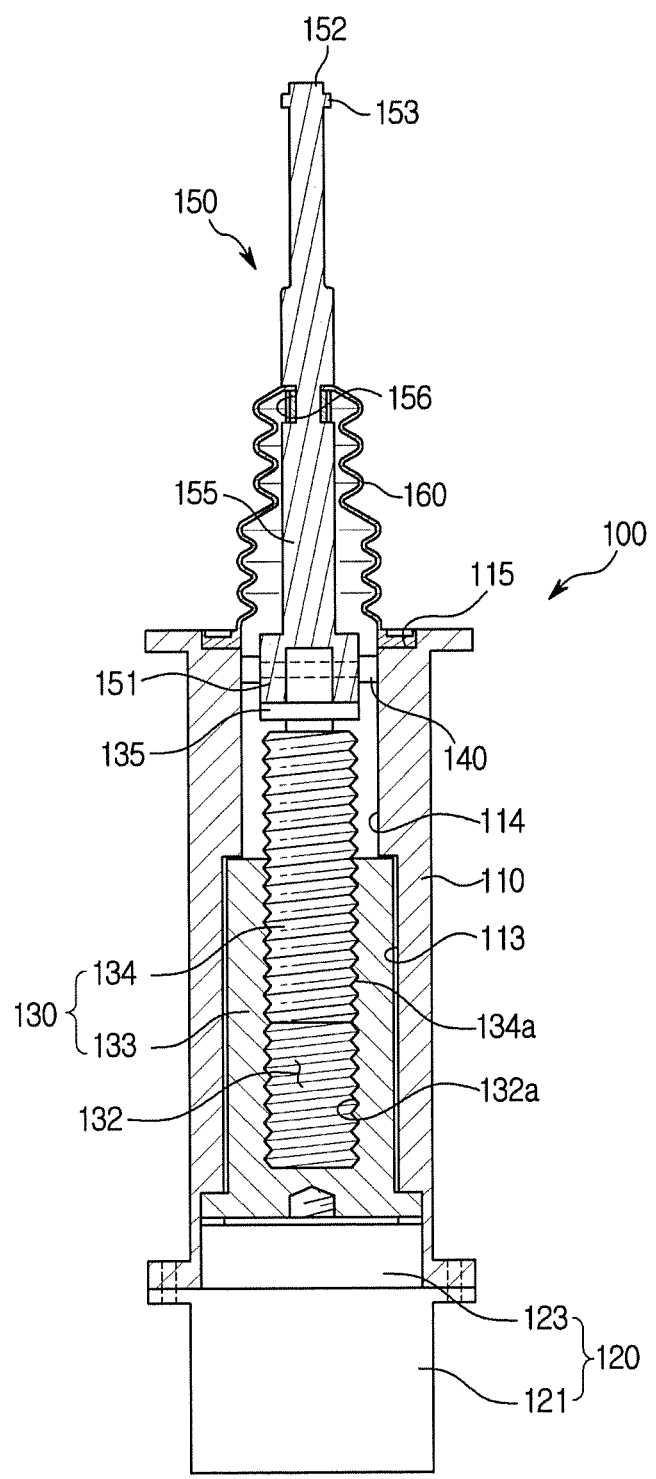
FIG. 1 is a cross-sectional view schematically illustrating a configuration of an electronic parking brake according to a first embodiment of the present disclosure.

Hereinafter, embodiments of the present disclosure will be described in detail with reference to the accompanying drawings. The embodiments to be described below are provided to fully convey the spirit of the present disclosure to those skilled in the art. The present disclosure is not limited to the embodiments disclosed herein and may be implemented in other forms. In the drawings, some portions not related to the description will be omitted and not shown in order to clearly describe the present disclosure, and also a size of a component may be somewhat exaggerated to facilitate understanding.

Figure 2:
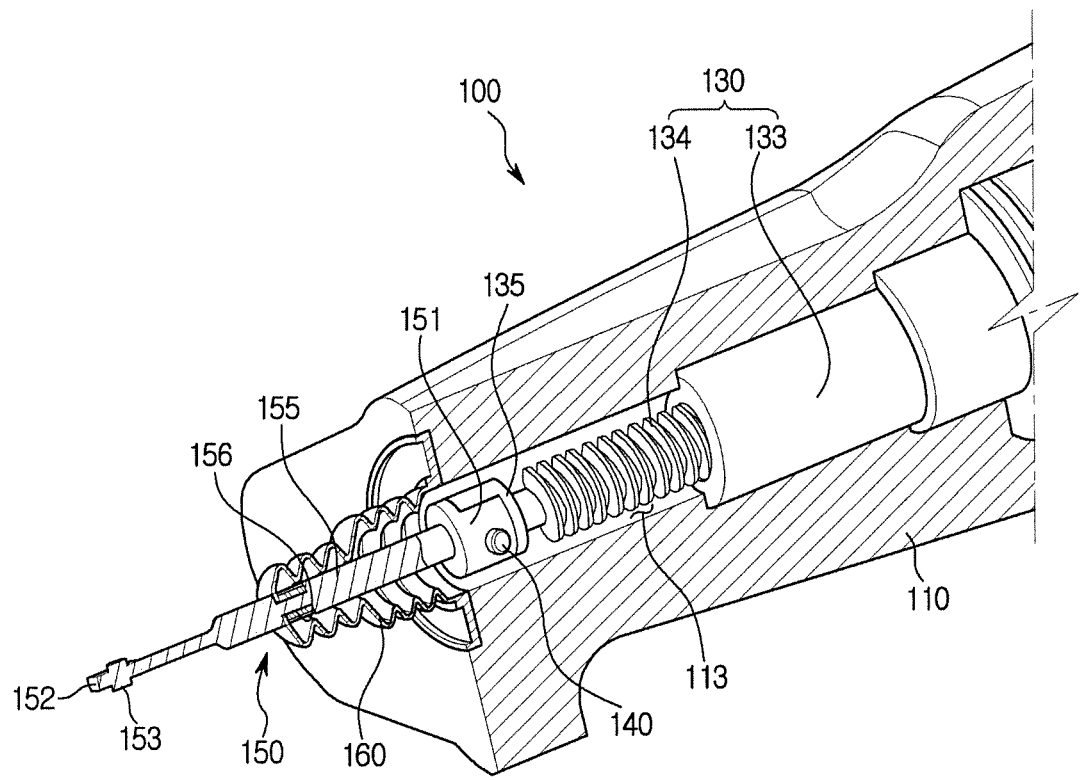
FIG. 2 is a partially incised perspective view schematically illustrating the configuration of the electronic parking brake according to the first embodiment of the present disclosure.
Figure 3:
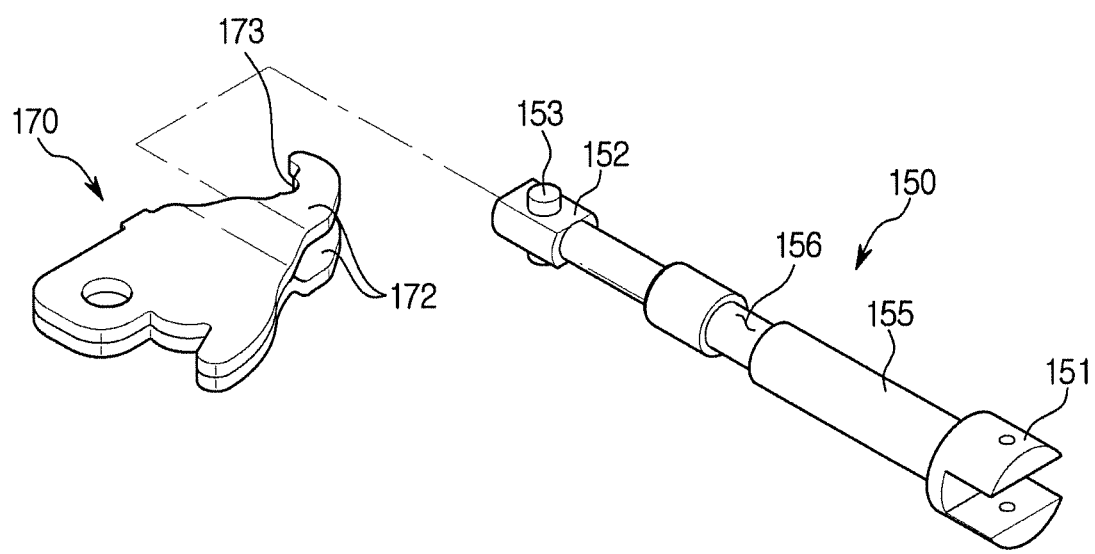
FIG. 3 is a partially extracted perspective view illustrating a coupled state of a parking cable and a pivot lever of the electronic parking brake according to the first embodiment of the present disclosure.
Figure 4:
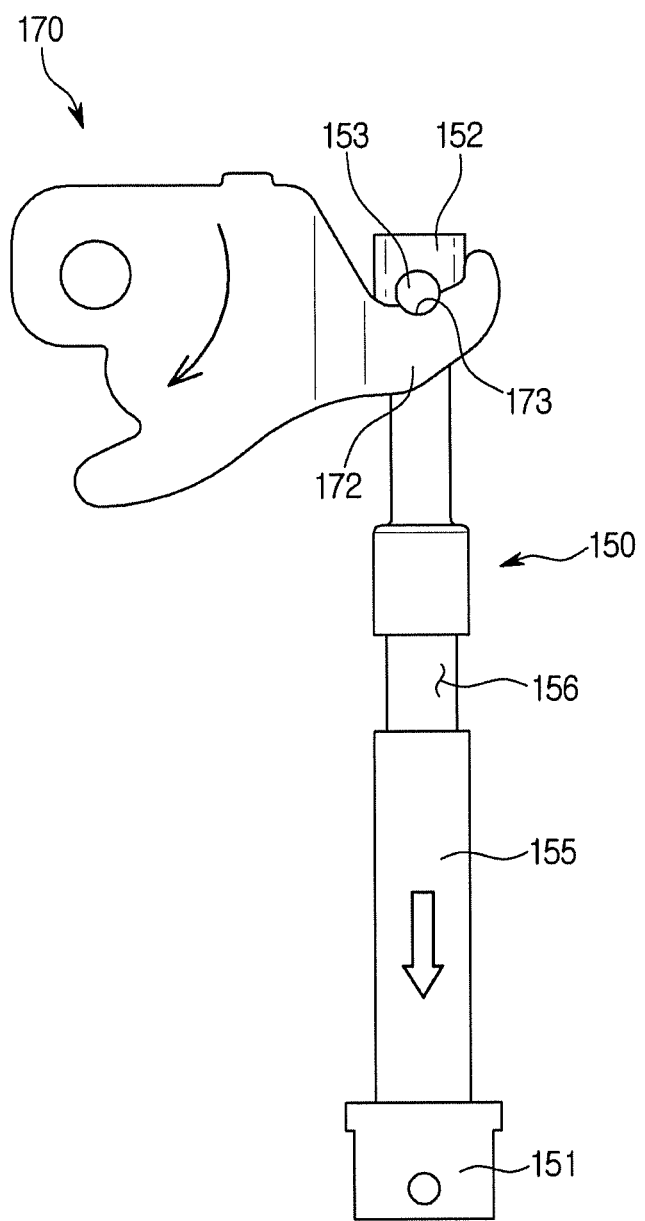
FIG. 4 is a diagram illustrating a contact state between the parking cable and the pivot lever of FIG. 3.

FIG. 1 is a cross-sectional view schematically illustrating a configuration of an electronic parking brake according to a first embodiment of the present disclosure, FIG. 2 is a partially incised perspective view schematically illustrating the configuration of the electronic parking brake according to the first embodiment of the present disclosure, FIG. 3 is a partially extracted perspective view illustrating a coupled state of a parking cable and a pivot lever of the electronic parking brake according to the first embodiment of the present disclosure, and FIG. 4 is a diagram illustrating a contact state between the parking cable and the pivot lever of FIG. 3.

Referring to FIGS. 1 to 4, an electronic parking brake 100 according to one aspect of the present disclosure includes a housing 110 mounted on a vehicle body, an actuator 120 installed at the housing 110 and configured to generate a driving force for braking, a power conversion unit 130 configured to receive the driving force from the actuator 120 and convert a rotational movement into a rectilinear movement, a parking cable 150 configured to move according to a reciprocal linear movement of the power conversion unit 130, operate a parking brake (not shown), and release an operation of the parking brake (not shown), and a dust cover 160 installed at the housing 110 and configured to prevent a flow of foreign materials into the housing 110.

The housing 110 is provided such that the actuator 120 and the power conversion unit 130 are accommodated inside the housing 110, and is fixed to a vehicle body, e.g., to a knuckle (not shown) of a vehicle. A through-hole 113 is formed at the housing 110 in a direction in which a spindle member 134 of the power conversion unit 130, which will be described below, performs a rectilinear movement. Also, a guide recess 114 is formed on an inner circumferential surface of the through-hole 113 in a length direction of the through-hole 113. The guide recess 114 is provided to support a guide pin 140, which will be described below, and will be described again below. Also, a seating recess 115 is formed at one end of the housing 110 at which the through-hole 113 is formed to maintain a tightly coupled state thereof with the dust cover 160, which will be described below.

The actuator 120 is provided with a motor 121 installed at the housing 110 and configured to generate the driving force, and a decelerator 123 connected to the motor 121. Here, the decelerator 123 serves to amplify the driving force generated by the motor 121 and transmit the amplified driving force to the power conversion unit 130, and, according to one aspect of the present disclosure, one of various known decelerators may be selected and used. For example, it should be understood that the decelerator 123 may be selected from one of various deceleration structures such as a planetary gear assembly, a spur gear assembly, an assembly of a worm gear and a worm wheel gear, and the like.

The driving force amplified by the above-described decelerator 123 is transmitted to the power conversion unit 130. The power conversion unit 130 converts a rotational force transmitted from the decelerator 123 into a rectilinear movement and serves to pull or release the parking cable 150. More particularly, the power conversion unit 130 is provided with a nut member 133 configured to be rotated by receiving the rotational force transmitted from the decelerator 123, and the spindle member 134 screw-coupled to the nut member 133 to allow a mutual rectilinear movement therewith.

The nut member 133 is rotatably coupled to the housing 110, and a screw hole 132 is formed inside the nut member 133 to pass therethrough in a length direction thereof. A female thread portion 132a is formed at the screw hole 132.

The spindle member 134 has a predetermined length, and a male thread portion 134a is formed on an outer circumferential surface of the spindle member 134 to be screw-coupled to the female thread portion 132a of the nut member 133. Accordingly, the spindle member 134 is reciprocally moved in the length direction of the screw hole 132 according to a rotational direction of the nut member 133. A cable holder 135 is provided at an end of the above-described spindle member 134 and is coupled to the parking cable 150 by the guide pin 140. Accordingly, the spindle member 134 performs a rectilinear movement from the nut member 133 to pull the parking cable 150 so that a pivot lever 170 connected to the parking cable 150 is pivoted to perform a braking operation.

The guide pin 140 connects the parking cable 150 to the spindle member 134, is supported by the housing 110, and serves to restrict rotation of the spindle member 134. As shown in the drawing, a slot-shaped recess is formed at the center of a first coupler 151 of the parking cable 150, and a protrusion is formed at a position of the cable holder 135 which corresponds to the recess, and is fitted into and coupled to the recess. That is, the guide pin 140 is installed to pass through the first coupler 151 and the cable holder 135 of the parking cable 150, which are fitted into and coupled to each other. Accordingly, the first coupler 151 is fixed to the cable holder 135 not to escape therefrom. At this point, the present embodiment has been illustrated and described such that the recess is formed at the first coupler 151 and the protrusion is formed at the cable holder 135, and thus the first coupler 151 and the cable holder 135 are coupled to each other, but the present disclosure is not limited thereto, and the protrusion may be formed at the first coupler 151 and the recess having a shape corresponding to the protrusion may be formed at the cable holder 135, and thus the first coupler 151 and the cable holder 135 may be coupled by the guide pin 140.

Meanwhile, the guide pin 140 is formed to protrude toward an outer side of the first coupler 151 by a predetermined portion when installed to pass through the cable holder 135 and the first coupler 151. This is because the guide pin 140 protruding from the first coupler 151 is inserted into the guide recess 114 formed at the housing 110 to restrict the rotation of the spindle member 134. Accordingly, the guide pin 140 serves to restrict the rotation of the spindle member 134, move with the spindle member 134 when the spindle member 134 is moved according to rotation of the nut member 133, and guide the spindle member 134.

The parking cable 150 is formed of a single integrated type steel bar body to prevent occurrence of a bending deformation. More particularly, the parking cable 150 is provided with the first coupler 151 coupled to the spindle member 134 and a second coupler 152 coupled to the pivot lever 170. The parking cable 150 is provided with a connector 155 configured to connect the first coupler 151 to the second coupler 152 and have a predetermined length, and the first and second couplers 151 and 152 and the connector 155 are integrally provided to have a single body. The parking cable 150 is manufactured with a steel bar made of a steel material through a computer numerical control (CNC) process to reduce a time required for a manufacturing process as well as manufacturing costs. Also, the parking cable 150 is made of a steel material configured with a single body different from a conventional parking cable using a wire so that a bending deformation does not occur even though the parking cable 150 receives a load when the braking operation is performed.

As is described above, the first coupler 151 is coupled to the cable holder 135 by the guide pin 140 in a state of being fitted into and coupled to the cable holder 135 which is formed at the spindle member 134. Accordingly, the first coupler 151, that is, the parking cable 150, is moved with the spindle member 134 according to a movement of the spindle member 134.

The second coupler 152 is coupled to the pivot lever 170 and serves to operate the pivot lever 170. As shown in the drawing, a latching part 153 protruding in a direction perpendicular to a length direction of the parking cable 150 is formed at the second coupler 152. As shown in the drawing, the latching part 153 is formed to have a cylindrical shape. Also, the latching part 153 may be integrally formed with the second coupler 152, but the latching part 153 may be installed at the second coupler 152 by passing a separate cylindrical pillar shaped member through the second coupler 152. The second coupler 152 is coupled to the pivot lever 170 via the latching part 153 to be in surface contact therewith.

Figure 5:
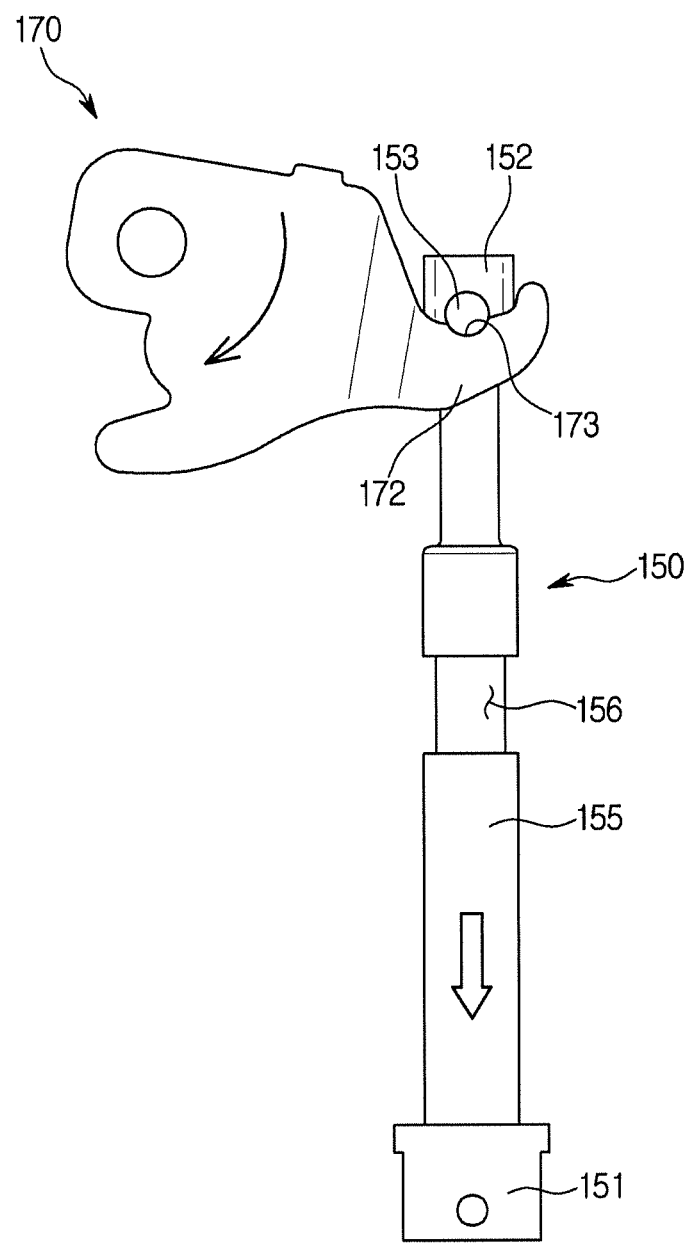
FIG. 5 is a diagram illustrating a state in which the pivot lever is operated by the parking cable of the electronic parking brake according to the first embodiment of the present disclosure.

Here, the pivot lever 170 is coupled to an operating lever (not shown) configured to support a pair of brake shoes (not shown) which are installed at both sides inside a drum (not shown), and, when the pivot lever 170 is pulled by the parking cable 150, the pivot lever 170 operates the operating lever to push the pair of brake shoes toward an inner surface of the drum, thereby generating a braking force. A drum in hat (DIH) type brake structure, which is configured to generate a braking force according to an operation of the above-described pivot lever 170, is a well-known related art, and thus a detailed description thereof will be omitted. At this point, the pivot lever 170 is formed to have a structure that is in surface contact with the parking cable 150 of the electronic parking brake 100 according to one aspect of the present disclosure. As shown in FIGS. 3 and 4, the pivot lever 170 is provided with a pair of supporters 172 that are formed such that one end of the pivot lever 170 branches to be positioned at both sides of the second coupler 152. A latching groove 173 is formed at each of the pair of supporters 172 to stably seat the latching part 153 on the pair of supporters 172. The latching groove 173 is formed to have an arc corresponding to an outer diameter of the latching part 153 having a cylindrical shape. Accordingly, a portion of an outer surface of the latching part 153 is inserted into the latching groove 173 and is in surface contact therewith. In such a state, when the pivot lever 170 is operated via the parking cable 150, the parking cable 150 is provided in an integrated type configured with a single body and is mechanically coupled to the spindle member 134 such that a response speed for operating the pivot lever 170 is improved. That is, the parking cable 150 may totally transmit a vertical force, which is generated when the parking cable 150 is pulled according to a movement of the spindle member 134, to the pivot lever 170. When the pivot lever 170 is operated via the parking cable 150, the pivot lever 170 is pivoted by a predetermined angle, and, as shown in FIG. 5, a contact surface of the latching part 153, which is in partial surface contact with the latching groove 173, is varied along the latching groove 173 to pull the pivot lever 170. That is, when the pivot lever 170 is operated, the latching groove 173 is smoothly moved along the outer surface of the latching part 153 to maintain a surface contact state therewith as well as to prevent the parking cable 150 from escaping from the pivot lever 170. Also, when the parking braking force is generated, the latching part 153 maintains a state of being in surface contact with the latching groove 173, and thus a load is distributed to a portion in surface contact with the latching groove 173 such that durability thereof may be improved.

Meanwhile, the present embodiment has been illustrated and described such that the latching part 153 is configured in a cylindrical shape and a cross section thereof has a circular shape, but the present disclosure is not limited thereto, and when the parking cable 150 is operated, a cross-sectional shape of the latching part 153 may be selectively modified as long as the latching part 153 pulls the pivot lever 170 to smoothly prevent occurrence of an asymmetric load.

Figure 6:
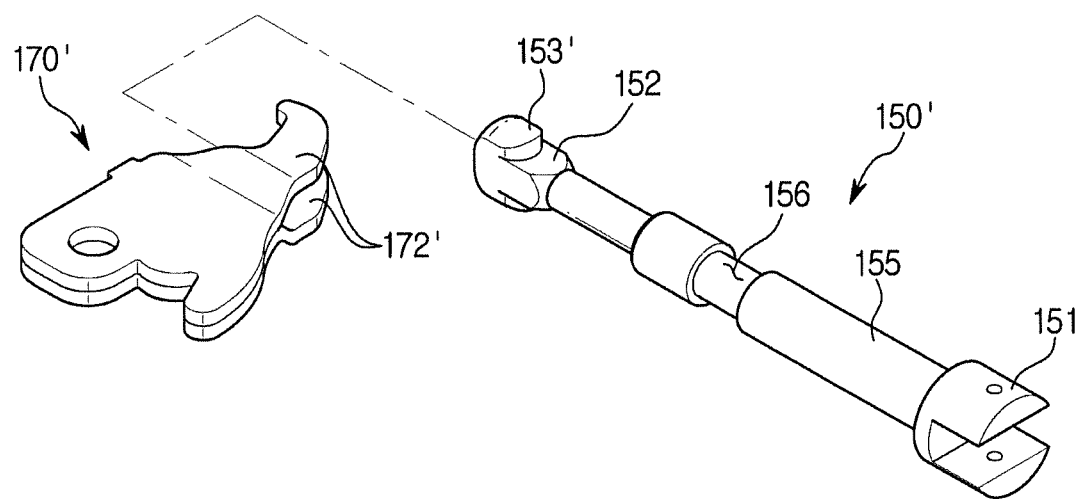
FIG. 6 is a diagram illustrating another configuration example of the parking cable and the pivot lever of the electronic parking brake according to the first embodiment of the present disclosure.
Figure 7:
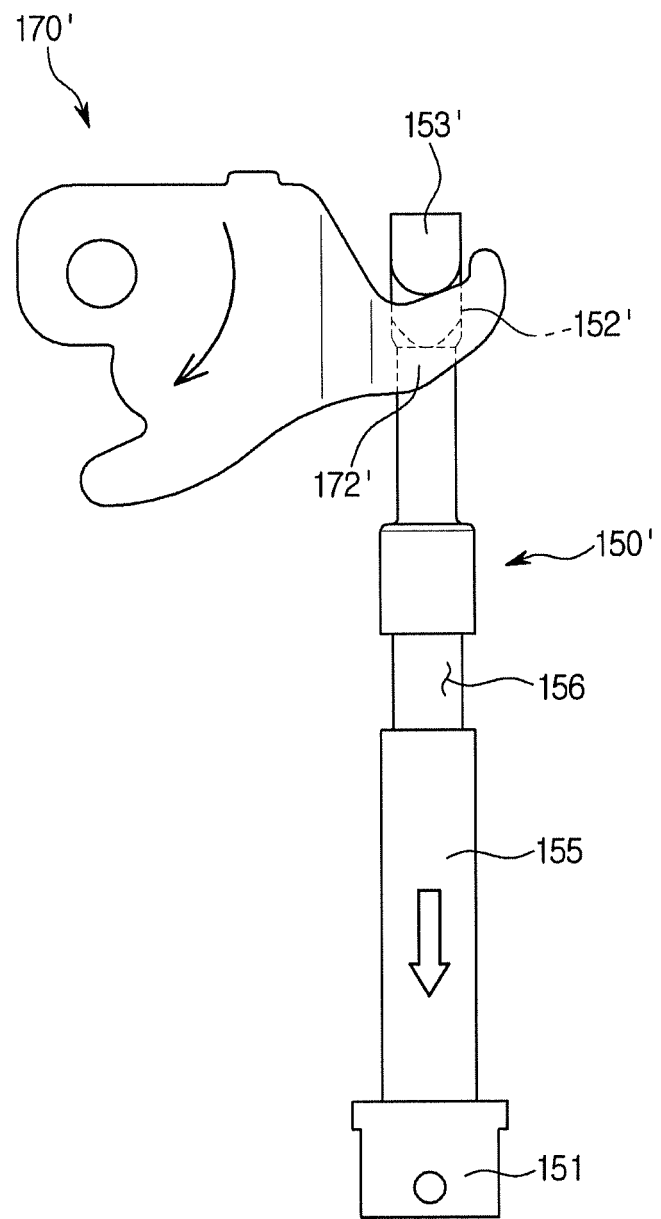
FIG. 7 is a diagram illustrating a contact state between the parking cable and the pivot lever of FIG. 6.

For example, a configuration of each of a parking cable 150' and a pivot lever 170', which have modified shapes, is shown in FIGS. 6 and 7.

FIG. 6 is a diagram illustrating another configuration example of the parking cable and the pivot lever of the electronic parking brake according to the first embodiment of the present disclosure, and FIG. 7 is a diagram illustrating a contact state between the parking cable and the pivot lever of FIG. 6. Here, the same reference numbers as those in the above-described drawings refer to members performing the same functions.

Referring to FIGS. 6 and 7, a latching part 153' is formed to protrude from the second coupler 152 to be in surface contact with an upper side of each of a pair of supporters 172' of the pivot lever 170'. The latching part 153' has an outer surface with a rounded shape. Also, a surface of each of the pair of supporters 172', which is in contact with the outer surface of the latching part 153', is formed to have a rounded shape. Accordingly, the latching part 153' and the pivot lever 170' are provided in a state of being in smooth surface contact with each other.

Referring back to FIGS. 1 and 4, the connector 155 has a predetermined length and is integrally formed with the first and second couplers 151 and 152. A coupling depression 156 is formed at the connector 155 and is depressed inside the connector 155 along an outer circumferential surface thereof. The coupling depression 156 is coupled to the dust cover 160, which will be described below, to prevent the dust cover 160 from escaping therefrom.

Meanwhile, the connector 155 is formed to have a relatively greater thickness than that of the second coupler 152. That is, a lower side of the second coupler 152, which is connected to the connector 155, has a smaller thickness than that of the connector 155. This is because the pair of supporters 172 are disposed at both of the sides of the second coupler 152, and thus interference during operation is prevented by a portion that is located between the pair of supporters 172.

The dust cover 160 is installed at an inlet side of the through-hole 113 of the housing 110 and is provided to surround an outer circumferential surface of the parking cable 150 to prevent a flow of foreign materials and moisture into the housing 110. The dust cover 160 has an inner space through which the parking cable 150 passes, and a plurality of wrinkles are formed on an outer surface of the dust cover 160. The dust cover 160 is made with a rubber material and performs a function of sealing between the parking cable 150 and the housing 110, and thus a flow of foreign materials and moisture into the housing 110 through the through-hole 113 is prevented.

The above-described electronic parking brake 100 is provided with an integrated type steel bar configured with a single body instead of a conventional wire type parking cable at which a bending phenomenon occurs due to a load when the braking operation is performed, and prevents occurrence of a bending deformation such that an increase of a stroke may be prevented when the braking operation is performed and an operating response speed may be improved. Also, the parking cable 150 is provided to be in smooth surface contact with the pivot lever 170 and thus a load, which is generated when the braking operation is performed, is distributed to prevent damage to the parking cable 150 and the pivot lever 170 such that durability may be improved.

Meanwhile, the electronic parking brake according to the present disclosure may be provided with two dust covers to more effectively block a flow of foreign materials into the housing. Such an embodiment is shown in FIGS. 8 to 10.

Figure 8:
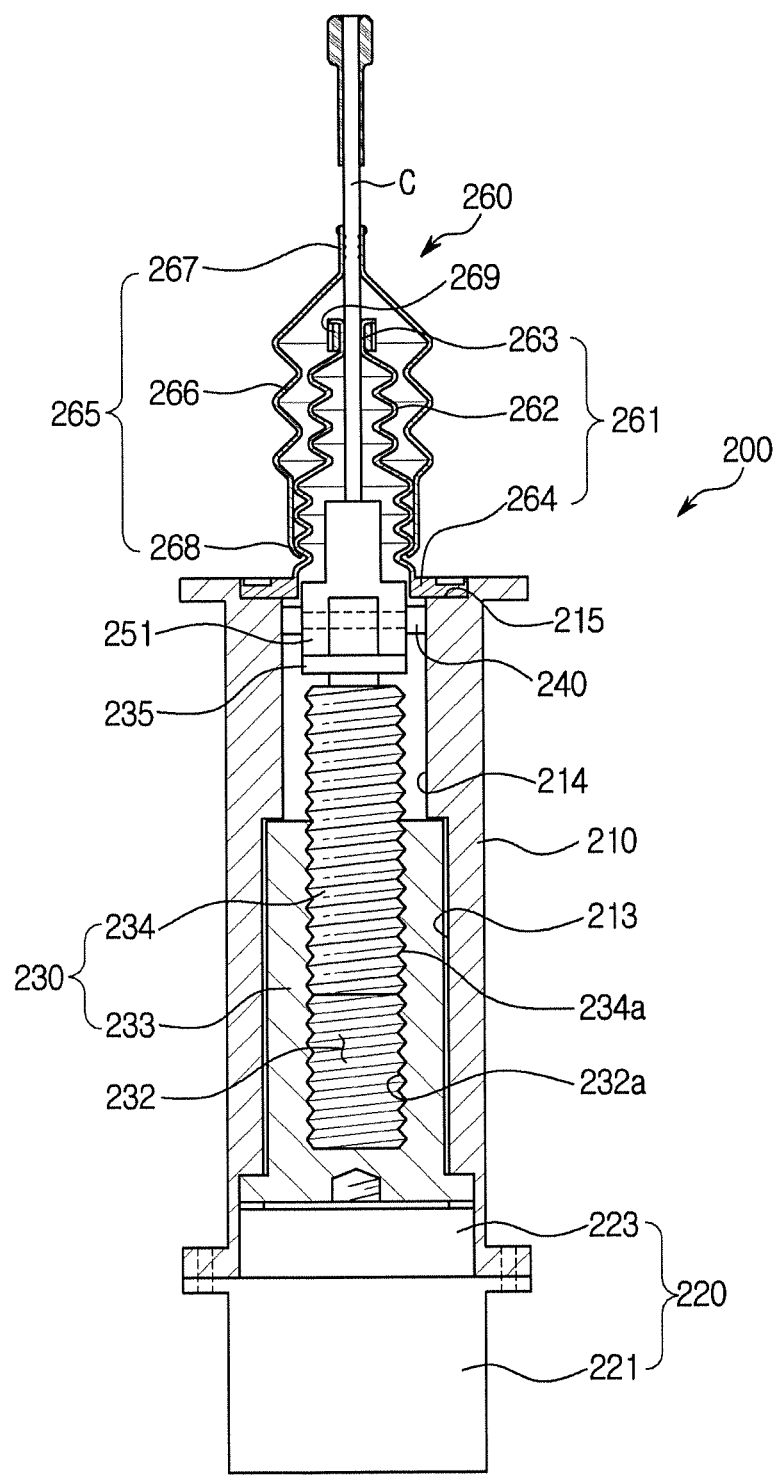
FIG. 8 is a cross-sectional view illustrating an electronic parking brake according to a second embodiment of the present disclosure.
Figure 9:
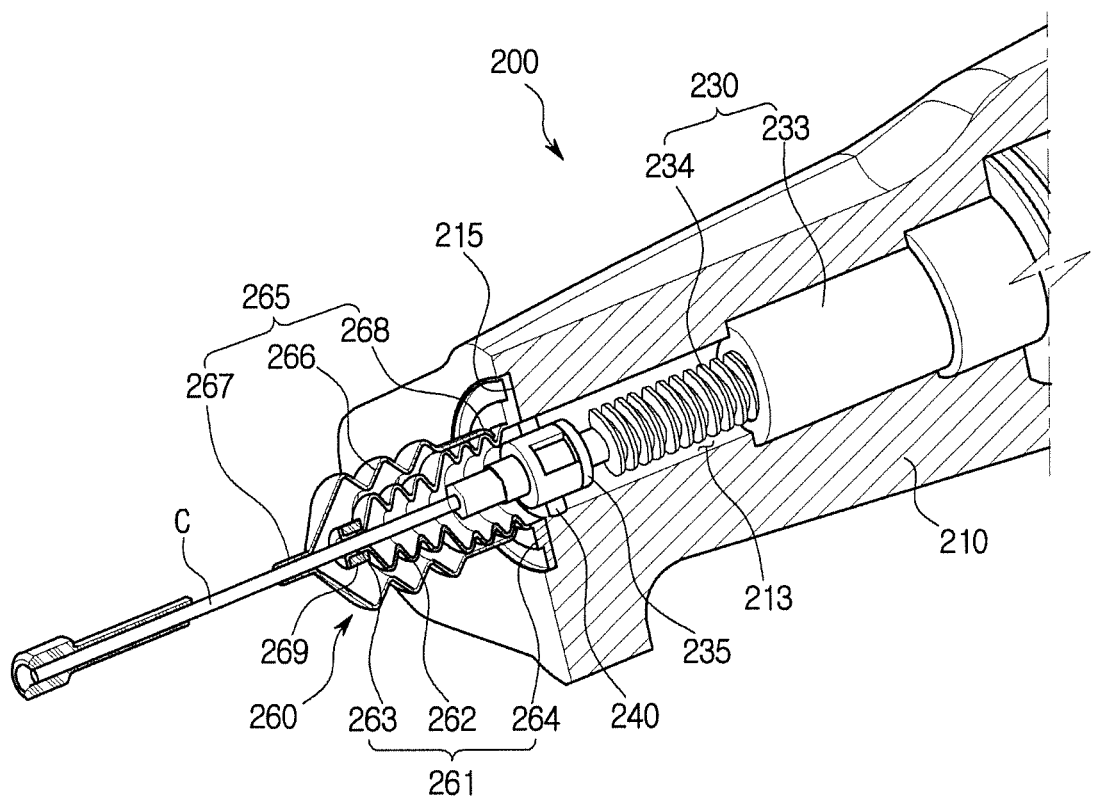
FIG. 9 is a partially incised perspective view illustrating an installation state of first and second dust covers provided at the electronic parking brake according to the second embodiment of the present disclosure.
Figure 10:
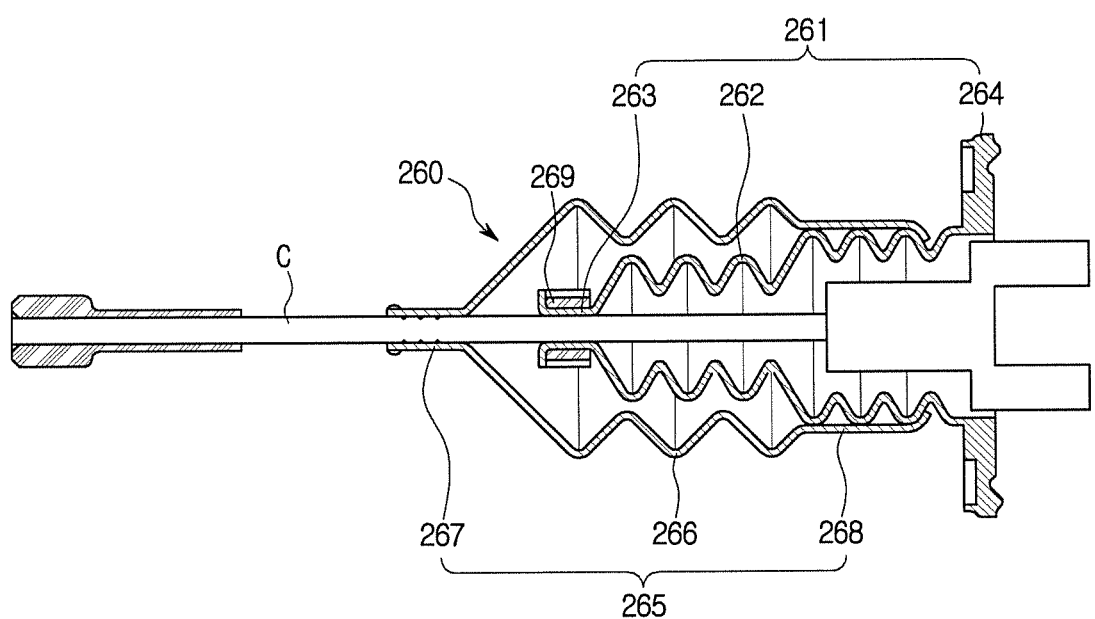
FIG. 10 is a partially extracted cross-sectional view illustrating the installation state of the first and second dust covers provided at the electronic parking brake according to the second embodiment of the present disclosure.

FIG. 8 is a cross-sectional view illustrating an electronic parking brake according to a second embodiment of the present disclosure, FIG. 9 is a partially incised perspective view illustrating an installation state of first and second dust covers provided at the electronic parking brake according to the second embodiment of the present disclosure, FIG. 10 is a partially extracted cross-sectional view illustrating the installation state of the first and second dust covers provided at the electronic parking brake according to the second embodiment of the present disclosure.

Referring to FIGS. 8 to 10, an electronic parking brake 200 according to the present embodiment includes a housing 210 mounted on a vehicle body, an actuator 220 installed at the housing 210 and configured to generate a driving force for braking, a power conversion unit 230 configured to receive the driving force from the actuator 220 and convert a rotational movement into a rectilinear movement, a parking cable C configured to move according to a reciprocal linear movement of the power conversion unit 230, operate a parking brake (not shown), and release an operation of the parking brake (not shown), and a dust cover 260 installed at the housing 210 and configured to prevent a flow of foreign materials into the housing 210. Here, the housing 210, the actuator 220, and the power conversion unit 230 have the same configurations and perform the same functions as the housing 110, the actuator 120, and the power conversion unit 130 of the precedent embodiment, and thus detailed descriptions thereof will be omitted.

Meanwhile, in the present embodiment, the parking cable C may be provided as a wire type parking cable. One end of the parking cable C is connected to a pivot lever (not shown), and the other end thereof is coupled to a cable holder 235, which is provided at an end of a spindle member 234, by a guide pin 240.

According to the present embodiment, the dust cover 260 is provided with a first dust cover 261 and a second dust cover 265 installed to surround the first dust cover 261.

The dust cover 261 is installed at an inlet side of a through-hole 213 of the housing 210 and is provided to surround an outer circumferential surface of the parking cable C to prevent a flow of foreign materials and moisture into the housing 210. More particularly, the first dust cover 261 is provided with a first body 262 having an inner space through which the parking cable C passes and an outer surface on which a plurality of wrinkles are formed, a first mounting part 264 provided at one end of the first body 262 and installed at the housing 210, and a first inflow prevention part 263 provided at the other end of the first body 262 and provided to surround an outer circumferential surface of a portion of the parking cable C.

The first dust cover 261 is made with a rubber material and performs a function of sealing between the parking cable C and the housing 210, and thus a flow of foreign materials and moisture into the housing 210 through the through-hole 213 is prevented. That is, the first inflow prevention part 263 is coupled to and in close contact with the outer circumferential surface of the portion of the parking cable C such that an inflow of foreign materials is blocked. Also, the first mounting part 264 is formed to extend from the first body 262 in a radial direction and is installed at the housing 210 such that a flow of foreign materials from the outside is blocked. As shown in the drawing, a seating recess 215 corresponding to the first mounting part 264 is formed at an inlet side of the through-hole 213 of the housing 210, and thus the first mounting part 264 may be fitted into and installed at the seating recess 215. Although not shown in the drawing, when the housing 210 is coupled to a vehicle body, the first mounting part 264 is in close contact with the vehicle body in association with the housing 210 such that a tightly coupled state thereof may be maintained.

Meanwhile, an undescribed reference number "269" is an engagement ring configured to maintain a state in which the first inflow prevention part 263 is in contact with the parking cable C.

The second dust cover 265 is installed to surround the first dust cover 261. More particularly, the second dust cover 265 is provided with a second body 266 having an inner space configured to accommodate the first dust cover 261 and an outer surface on which a plurality of wrinkles are formed, a second mounting part 268 provided at one end of the second body 266 and installed at the first dust cover 261, and a second inflow prevention part 267 provided at the other end of the second body 266 and provided to surround an outer circumferential surface of a portion of the parking cable C.

The second dust cover 265 is made with a rubber material and performs a function of sealing between the parking cable C and the first dust cover 261. That is, in association with the first dust cover 261, the second dust cover 265 has a dual sealing structure configured to prevent a flow of foreign materials and moisture into the housing 210.

The second inflow prevention part 267 is positioned to be farther away from the housing 210 than the first inflow prevention part 263, and is provided to surround the outer circumferential surface of the parking cable C. Accordingly, a primary sealing action is performed between the second inflow prevention part 267 and the parking cable C and a secondary sealing action is performed between the first inflow prevention part 263 and the parking cable C.

The second mounting part 268 is in close contact with and coupled between the wrinkles of the first body 262. That is, an end portion of the second mounting part 268 is formed to be bent and is coupled between the wrinkles of the first body 262. The second dust cover 265 is made with a rubber material having an elastic force, and the second mounting part 268 is installed to pressurize the first body 262 such that a coupled state thereof may be maintained.

The dust cover 260 provided at the above-described electronic parking brake 200 is configured to have a dual sealing structure such that a flow of foreign materials into the housing 210 may be more effectively prevented.

Meanwhile, in the present embodiment, the dust cover 260 has been illustrated and described as having the dual sealing structure and being installed at the wire type parking cable C, but the present disclosure is not limited thereto, and, as in the above described first embodiment, the dust cover 260 may be installed at the parking cable having the single integrated type steel bar body (See, "150" of FIG. 1). That is, the steel bar type parking cable 150 according to the first embodiment and the dust cover having the dual sealing structure (See, "260" of FIG. 8) according to the second embodiment may be structurally grafted with each other. An electronic parking brake 300 having the above-described structure is shown in FIGS. 11 and 12.

Figure 11:
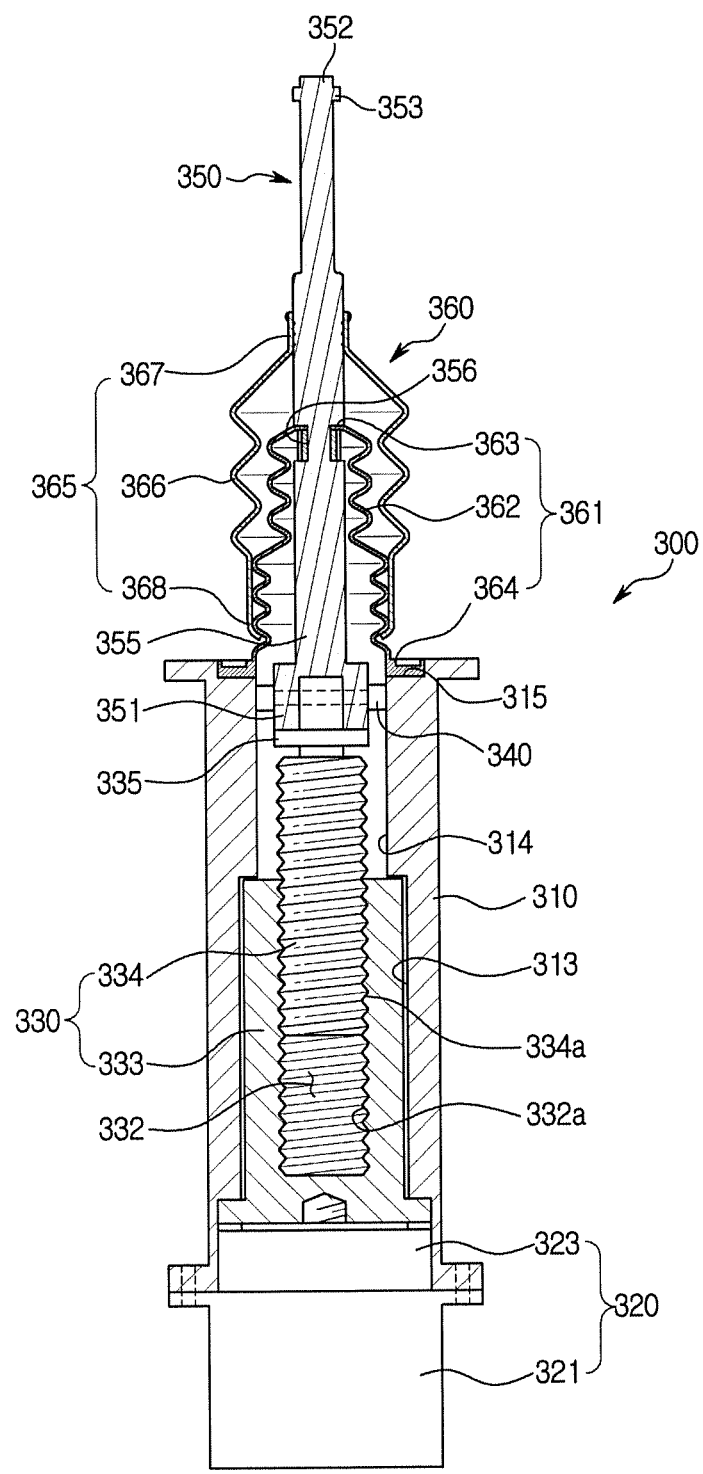
FIG. 11 is a cross-sectional view illustrating an electronic parking brake according to a third embodiment of the present disclosure.
Figure 12:
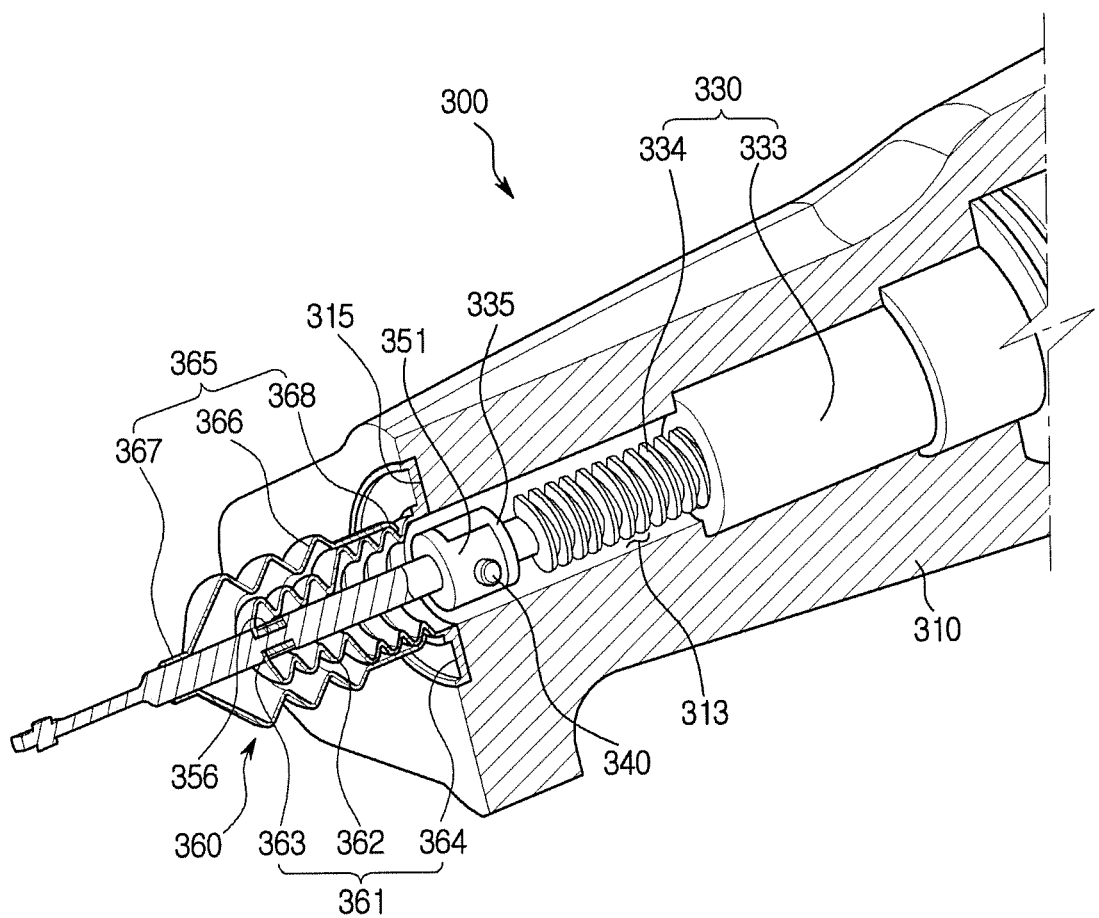
FIG. 12 is a partially incised perspective view schematically illustrating a configuration of the electronic parking brake according to the third embodiment of the present disclosure.

FIG. 11 is a cross-sectional view illustrating an electronic parking brake according to a third embodiment of the present disclosure, and FIG. 12 is a partially incised perspective view schematically illustrating a configuration of the electronic parking brake according to the third embodiment of the present disclosure.

Referring to FIGS. 11 to 12, an electronic parking brake 300 according to the present embodiment includes a housing 310 mounted on a vehicle body, an actuator 320 installed at the housing 310 and configured to generate a driving force for braking, a power conversion unit 330 configured to receive the driving force from the actuator 320 and convert a rotational movement into a rectilinear movement, a parking cable 350 configured to move according to a reciprocal linear movement of the power conversion unit 330, operate a parking brake (not shown), and release an operation of the parking brake (not shown), and a dust cover 360 installed at the housing 310 and configured to prevent a flow of foreign materials into the housing 310.

Here, the housing 310, the actuator 320, the power conversion unit 330, and the parking cable 350 have the same configurations and perform the same functions as the housing 110, the actuator 120, the power conversion unit 130, and the parking cable 150 of the first embodiment, and thus detailed descriptions thereof will be omitted.

Also, the dust cover 360 is provided with first and second dust covers 361 and 365, and the first and second dust covers 361 and 365 have the same configurations and perform the same functions as the first dust cover 261 and the second dust cover 265 of the second embodiment.

The electronic parking brake 300 having the above-described structure will be briefly described.

The parking cable 350 is formed with a single integrated type steel bar body to prevent occurrence of a bending deformation. That is, the parking cable 350 is provided with a first coupler 351 coupled to a spindle member 334, a second coupler 352 coupled to a pivot lever (not shown), and a connector 355 configured to connect the first coupler 351 to the second coupler 352. Here, a latching part 353 is formed to protrude from the second coupler 352 and is connected to the pivot lever to operate the pivot lever. An outer surface of the latching part 353 may be configured to have a rounded shape, and thus the latching part 353 may be in surface contact with the pivot lever to smoothly operate the pivot layer without an asymmetric load occurring. Also, a coupling depression 356 is formed to be depressed inside the connector 355 along an outer circumferential surface thereof and is coupled to the first dust cover 361, which will be described below.

The first dust cover 361 is provided with a first body 362 having an outer surface on which a plurality of wrinkles are formed, a first mounting part 364 provided at one end of the first body 362 and installed at the housing 310, and a first inflow prevention part 363 provided at the other end of the first body 362 and installed at the parking cable 350. That is, the first inflow prevention part 363 is coupled to a coupling depression 356 formed at the connector 355 of the parking cable 350, and the first mounting part 364 is fitted into and coupled to a seating recess 315 of the housing 310. Accordingly, the first dust cover 361 may be maintained in a stable coupled state between the housing 310 and the parking cable 350 and also may be prevented from escaping.

The second dust cover 365 is provided with a second body 366 having an outside surface on which a plurality of wrinkles are formed, a second mounting part 368 provided at one end of the second body 366 and coupled to the first dust cover 361, and a second inflow prevention part 367 provided at the other end of the second body 366 and provided to surround an outer circumferential surface of a portion of the parking cable 350.

The second inflow prevention part 367 is positioned to be farther away from the housing 310 than the first inflow prevention part 363 and is provided to surround the outer circumferential surface of the parking cable 350, that is, to surround an outer circumferential surface of a predetermined portion of the connector 355.

The second mounting part 368 is in close contact with and coupled between the wrinkles of the first body 362. That is, an end portion of the second mounting part 368 is formed to be bent and coupled between the wrinkles of the first body 362.

Each of the first dust cover 361 and the second dust cover 365 is made with a rubber material to perform a function of sealing between the parking cable 350 and the housing 310. Accordingly, a primary sealing action is performed between the second inflow prevention part 367 and the parking cable 350 and a secondary sealing action is performed between the first inflow prevention part 363 and the parking cable 350 such that a flow of foreign materials and moisture into the housing 310 is effectively prevented.

As should apparent from the above description, the electronic parking brake according to one embodiment of the present disclosure is capable of preventing an increase of a stroke when a braking operation is performed to improve an operation response speed by providing the parking cable with a single integrated type steel bar body to prevent occurrence of a bending deformation. Consequently, power transmission performance according to braking of the electronic parking brake is improved.

Also, the parking cable is manufactured with the single integrated type steel bar body such that a structure thereof may be simplified to reduce the number of processes and manufacturing costs. Accordingly, the parking cable may be not required to be separately manufactured by a specialized company, and thus a problem due to commercialization and an assembly tolerance between products may be resolved.

Also, the parking cable and the pivot lever may be provided to be smoothly in surface contact with each other such that there is an effect in which the parking cable may be prevented from escaping when the braking operation is performed and stress concentration due to a smooth surface contact may be eliminated to improve durability.

Also, the first dust cover and the second dust cover are installed at a portion connecting the housing to the parking cable such that a flow of foreign materials and moisture into the housing may be prevented according to a dual sealing action. Consequently, an incorrect operation or a failure of a product may be prevented to improve reliability and stability of the product as well as prolong a lifetime of the product.

Although the present disclosure has been described above by way of specific embodiments and the accompanying drawings, the present disclosure is not limited thereto, and it should be understood that numerous other changes and modifications can be devised by those skilled in the art that will fall within the spirit and scope of this disclosure and within the full range of equivalents to which the appended claims are entitled.

What is claimed is:

1. An electronic parking brake provided with an operating lever, which is configured to support first and second brake shoes, which are installed at both sides inside a drum, and push the first and second brake shoes toward an inner surface of the drum when a pivot lever is pulled, and electronically activated to operate the pivot lever to brake the drum, the electronic parking brake comprising:
   a housing mounted on a vehicle body;
   an actuator installed at the housing and configured to generate a driving force for braking;

a power conversion unit having a nut member configured to be rotated by receiving the driving force from the actuator, and a spindle member screw-coupled to the nut member to allow a rectilinear movement;

a parking cable configured to move according to a reciprocal linear movement of the spindle member, operate the parking brake, release an operation of the parking brake, and be connected to an end of one side of the spindle member; and a dust cover configured to prevent a flow of foreign materials between the parking cable and the power conversion unit, wherein the parking cable has a predetermined length and is formed with a single integrated type steel bar body to prevent occurrence of a bending deformation, the dust cover includes a first dust cover installed at an inlet side of a through-hole of the housing such that a flow of foreign materials into the housing is prevented, and provided to surround an outer circumferential surface of a portion of the parking cable, wherein the through-hole is formed in a movement direction of the spindle member, the first dust cover includes:
  a first body having an inner space through which the parking cable passes; and
  a first mounting part disposed on one end of the first body and coupled to the housing, the first mounting part extends from the first body in a radially outward direction, the parking cable comprises a first coupler coupled to the spindle member, a second coupler coupled to the pivot lever, and a connector connecting the first coupler to the second coupler, the pivot lever is provided with a pair of supporters which are formed such that one end of the pivot lever branches to be positioned at both sides of the second coupler, and the second coupler includes a latching part protruding therefrom, the latching part being in surface contact with an upper side of the pair of supporters.

2. The electronic parking brake of claim 1, wherein a coupling depression is formed at an outer side of the parking cable to be coupled to the dust cover.

3. The electronic parking brake of claim 1, wherein the dust cover further includes
  a second dust cover installed to surround the first dust cover.

4. The electronic parking brake of claim 3, wherein:
  the first body has an outside surface on which a plurality of wrinkles are formed, and
  the first dust cover further includes a first inflow prevention part disposed on another end of the first body and surrounding the outer circumferential surface of the parking cable.

5. The electronic parking brake of claim 4, wherein a seating recess corresponding to the first mounting part is formed at the housing to enable the first mounting part to be inserted into the inlet side of the through-hole.

6. The electronic parking brake of claim 4, wherein the second dust cover includes:
  a second body having an inner space configured to accommodate the first dust cover, and an outside surface on which a plurality of wrinkles are formed;
  a second mounting part provided at one end of the second body and coupled to the first dust cover; and
  a second inflow prevention part provided at the other end of the second body and provided to surround an outer circumferential surface of a portion of the parking cable.

7. The electronic parking brake of claim 6, wherein the second inflow prevention part is positioned to be farther away from the housing than the first inflow prevention part, and is provided to surround the outer circumferential surface of the parking cable.

8. The electronic parking brake of claim 6, wherein the second mounting part is formed to be bent, and is in close contact with and coupled between the wrinkles of the first body.

9. The electronic parking brake of claim 3, wherein the first and second dust covers are configured with an elastically deformable rubber material.

10. The electronic parking brake of claim 1, wherein the latching part is movable relative to the pivot lever, and having a cylindrical shape.

11. The electronic parking brake of claim 1, wherein the connector is formed to have a relatively greater thickness than the second coupler.

12. The electronic parking brake of claim 1, wherein an outer surface of the latching part has a rounded shape, and a rounded latching groove is formed at each of the pair of supporters to correspond to and be in contact with the outer surface of the latching part.

* * * * *